United States Patent

Ju et al.

(10) Patent No.: US 6,697,377 B1
(45) Date of Patent: Feb. 24, 2004

(54) METHOD FOR COMMUNICATING AUDIO DATA IN A PACKET SWITCHED NETWORK

(75) Inventors: Paul Pay-Lun Ju, Cupertino, CA (US); Seaway Jan, Cupertino, CA (US)

(73) Assignee: Innomedia PTE Ltd. (SG)

( * ) Notice: Subject to any disclaimer, the term of this patent is extended or adjusted under 35 U.S.C. 154(b) by 509 days.

(21) Appl. No.: 09/693,611

(22) Filed: Oct. 21, 2000

(51) Int. Cl.$^7$ .................................................. H04J 3/16
(52) U.S. Cl. ....................................... 370/466; 370/252
(58) Field of Search ................................ 370/351–358, 370/493–495, 395, 395.3, 395.31, 395.52, 395.53, 401, 466

(56) References Cited

U.S. PATENT DOCUMENTS

| | | |
|---|---|---|
| 5,799,068 A | 8/1998 | Kikinis et al. |
| 5,805,803 A | 9/1998 | Birrell |
| 5,916,302 A | 6/1999 | Dunn et al. |
| 6,061,347 A | 5/2000 | Hollatz |
| 6,075,783 A | 6/2000 | Voit |
| 6,185,184 B1 | 2/2001 | Mattaway et al. |
| 6,321,253 B1 | 11/2001 | McKeen et al. |
| 6,483,912 B1 * | 11/2002 | Kalmanek, Jr. et al. .... 379/219 |

FOREIGN PATENT DOCUMENTS

| | | |
|---|---|---|
| EP | 0 781 015 A | 6/1997 |
| EP | 0841 831 A | 5/1998 |
| EP | 0 841 831 A2 * | 5/1998 |
| EP | 0 096 145 A | 12/1999 |

OTHER PUBLICATIONS

Alan B. Johnston, Understanding The Session Initiation Protocol Publisher Artech House, Boston, 2001.
Fredrick Thernelius, SIP, NAT, & Firewalls.
J. Rosenberg, D. Drew, H. Schulzrinne Getting SIP Through Firewalls & NATS.
Databean Primer, A Primer on the H. 323 Standard.
Asim Karim, H. 323 and Associated Protocols.

* cited by examiner

*Primary Examiner*—Wellington Chin
*Assistant Examiner*—Brenda Pham
(74) *Attorney, Agent, or Firm*—Timothy P. O Hagan

(57) ABSTRACT

A tunneling address translation engine enables a Internet protocol packet audio conversation to be maintained between two device. At least one of the devices may be behind a firewall or behind a network address translator, or proxy server. The tunneling address translation engine routes frames of audio data to an intended destination utilizing unreliable data protocols which do not include source address information. An audio conversation may be maintained through a sequence of tunneling address translation engines.

9 Claims, 9 Drawing Sheets

| Directory Server 26 | | | | | |
|---|---|---|---|---|---|
| Phone Number ID 202 | IP Address - Virtual 204 | Port - Q.931 206 | Proxy IP Address 208 | Proxy Port - Q.931 210 |
| | | | | |
| | | | | |
| | | | | |
| | | | | |
| | | | | |
| | | | | |

Figure 2

| Call # | Q.931 Connections | | | | | H.245 Connections | | | | | | RTP Routing | | | | | | | | | | | | |
|---|---|---|---|---|---|---|---|---|---|---|---|---|---|---|---|---|---|---|---|---|---|---|---|---|
| | 1st Device | | | 2nd Device | | | 1st Device | | | 2nd Device | | | First Device | | | | | | Second Device | | | | | |
| | | | | | | | | | | | | | Inbound | | | Outbound | | | Inbound | | | Outbound | | |
| | 1st | TAT | | 2nd | TAT | | 1st | TAT | | 2nd | TAT | | 1st | TAT | | 1st | TAT | | 1st | TAT | | 1st | TAT | |
| | IP/Port | IP/Port | IP/Port | IP/Port | IP/Port | IP/Port | IP/Port | IP/Port | IP/Port | IP/Port | IP/Port | IP/Port | IP/Port | IP/Port | IP/Port | IP/Port | IP/Port | IP/Port | IP/Port | IP/Port | IP/Port | IP/Port | IP/Port | IP/Port |
| 1 | | | | | | | | | | | | | | | | | | | | | | | | |
| 2 | | | | | | | | | | | | | | | | | | | | | | | | |
| 3 | | | | | | | | | | | | | | | | | | | | | | | | |
| 4 | | | | | | | | | | | | | | | | | | | | | | | | |
| 5 | | | | | | | | | | | | | | | | | | | | | | | | |
| 6 | | | | | | | | | | | | | | | | | | | | | | | | |
| * | | | | | | | | | | | | | | | | | | | | | | | | |
| * | | | | | | | | | | | | | | | | | | | | | | | | |
| * | | | | | | | | | | | | | | | | | | | | | | | | |
| * | | | | | | | | | | | | | | | | | | | | | | | | |

Figure 8

METHOD FOR COMMUNICATING AUDIO DATA IN A PACKET SWITCHED NETWORK

TECHNICAL FIELD

The present invention relates to communicating audio data in a packet switched network and, more specifically, to communicating frames of audio data between devices which are separated by a firewall and/or a network address translation device.

BACKGROUND OF THE INVENTION

For many years voice telephone service was implemented over a circuit switched network commonly known as plain old telephone service (POTS) and controlled by a local telephone service provider. In such systems, the analog electrical signals representing the conversation was transmitted from each telephone handset to a switching station, and between switching stations, on a dedicated pair of copper wires.

More recently, trunk lines between switching stations have been replaced with fiber optic cables. A computing device digitizes the analog signals and formats the digitized data into frames such that multiple conversations can be transmitted simultaneously on the same fiber. At the receiving end, a computing device reforms the analog signals for transmission on copper wires. Twisted pair copper wires are still used to couple the telephone handset to the local switching station.

More recently yet, voice telephone service has been implemented over the Internet. Advances in the speed of Internet data transmissions and Internet bandwidth have made it possible for telephone conversations to be communicated using the Internet's packet switched architecture and the TCP/IP protocol.

Software is available for use on personal computers which enable the two-way transfer of real-time voice information via an Internet data link between two personal computers, each of which includes appropriate hardware for driving a microphone and a speaker. The sending computer converts voice signals from analog format, as detected by the microphone hardware, to digital format. The software facilitates data compression down to a rate compatible with the sending computers data connection to an Internet Service Provider (ISP) and facilitates encapsulation of the digitized and compressed voice data into the TCP/IP protocol, with appropriate addressing to permit communication via the Internet.

At the receiving end, the computer and software reverse the process to recover the analog voice information for presentation to the other party via the speaker associated with the receiving computer. Additionally, gateway computers are available which couple to both the Internet and to a local telephone switching station. The gateway effectively operates to couple one caller via the Internet with another caller via a traditional telephone.

The Internet communication between the sending computer and the receiving computer occurs using the Internet addressing scheme. An Internet Protocol (IP) address comprises four numbers separated by dots. Each machine on the Internet has a unique number assigned to it which constitutes one of these four numbers. In the address the left most number has the greatest weight. By analogy this would correspond to the ZIP code in a mailing address. At times the first two numbers constitute this portion of the address indicating a network or a locale. That network is connected to the last router in the transport path. In differentiating between two computers in the same destination network only the last number field changes. In such an example the next number field identifies the destination router. When the packet bearing the destination address leaves the source router it examines the first two numbers in a matrix table to determine how many hops are the minimum to get to the destination. It then sends the packet to the next router as determined from that table and the procedure is repeated. Each router has a database table that finds the information automatically. This continues until the packet arrives at the destination computer. The separate packets that constitute a message may not travel the same path depending on traffic load. However they all reach the same destination and are assembled in their original order in a connectionless fashion.

A challenge with providing voice telephone service over the Internet is that one or both of the sending computer and the destination computer may be accessing the internet through a network address translation (NAT), or proxy, server or a firewall which may, in addition to generally blocking certain connections, include NAT functionality. A NAT server enables several computers to share a single IP address.

Typical NAT server architecture includes a private network coupling each of the computers to the NAT. The NAT server has an assigned IP address and is coupled to the Internet. In operation, a computer accessing the internet through a NAT would send a frame to the NAT server via the private network. The frame would include the destination computer IP address and the sending computer's private network address. The NAT server in turn would send a frame on the Internet to the destination computer IP address and include the NAT server IP address as the source IP address. The NAT server maintains a table which matches the sending computer on the private network with the port number used by the NAT server communicating with the destination computer via the Internet. When a return frame is received by the NAT from the destination computer on a particular port, the NAT server utilizes the table to find the address of the original sending computer.

The problem encountered is that the data frames representing the voice conversation utilize the User Datagram Protocol; (UDP) which is an unreliable real time connectionless protocol (RTP). RTP utilizes frame formats with minimal overhead data to optimize network bandwidth, as such there is no source address field included in the frame. As such, when a NAT server receives a UDP frame on the private network for routing to an IP address via the Internet, the frame does not include the sending computer source address and therefore the NAT server cannot set up a record in the table matching the sending computer to the port number.

What is needed is a method for communicating UDP frames between two devices on a packet switched network in a configuration where at least one of the two devices is coupled to the network through a NAT.

SUMMARY OF THE INVENTION

A first aspect of the present invention is to provide a method of audio communication between a first and second client through a packet switched network, such as the Internet. The method comprises sending a set-up request from the first client to a translation device and, in turn, sending a set-up request from the translation device to the second client. Thereafter, an acknowledge set-up is sent from the second client to the translation device and, in turn, sending an acknowledge set-up from the translation device to the first client. These steps may utilize the Q.931 protocol which is an interface layer basic call control protocol recommended by the International Telephony Union (ITU) and is named ISDN User-Network Interface Layer 3 Specification for Basic Call Control.

The method further includes establishing a daisy chained connection through the translation device including the steps of establishing a first communication channel between a port on the first client and a first dynamic port on the translation device for communicating frames of audio data between the first client and the translation device and establishing a second communication channel between a port on the second client and a second dynamic port on the translation device for communicating frames of audio data between the second client and the translation device. A table is maintained in the translation device which includes data relating the first dynamic port and the second dynamic port such that audio communication data, utilizing a real time protocol (RTP) and real time control protocol (RTCP) may be transferred between the first communication channel and the second communication channel independent of source address information.

In one embodiment, the second client is located on a private network and the translation device is coupled between the Internet and the second client. As such, the second communication channel is implemented on the private network and the method further includes querying a database to determine an IP address of the translation device and a private network address of the second client.

In a second embodiment, the first client is located on a private network and the translation device is coupled between the Internet and the first client. The second client may be directly addressable on the Internet. As such, the first communication channel is implemented on a private network and the method further includes querying a data base to determine an IP address of the second client.

In a third embodiment, the first client is located on a first private network with the translation device (being a first translation device) coupled between the first client and the Internet and the second client is also located on a second private network with a second translation device being coupled between the second client and the Internet.

As such, in the method being described, the second communication channel includes the second translation device interposed between the first translation device and the second client. The step of sending a set-up request from the first translation device to the second client includes sending a set-up request from the first translation device to the second translating device and sending a set-up request from the second translation device to the second client. The step of sending the acknowledge set-up from the second client to the first translation device includes sending an acknowledge set-up from the second client to the second translation device and sending an acknowledge set-up from the second translation device to the first translation device. The step of establishing the second communication channel includes: establishing a communication channel between a port on the second client and a first dynamic port on the second translation device and establishing a communication channel between a second dynamic port on the second translation device and the second dynamic port on the first translation device.

A second aspect of the present invention is to provide a tunneling address translation (TAT) engine for maintaining a packet audio conversation between a first and second client. The translation engine comprises a first network interface for exchanging frames of audio data with the first client on a first network and a second network interface for exchanging frames of audio data with the second client on a second network. A memory maintains data related to the packet audio conversation between the first and the second device to enable the engine to forward frames from the first client on the first network to the second client on the second network and from the second client on the second network to the first client on the first network, independent of source address data. The frames of audio data are real time protocol frames.

The address translation engine may include a call set-up engine for: a) receiving a set-up request on the first network interface; b) sending a set-up request on the second network interface in response to receipt of the set-up request on the first network interface; c) receiving an acknowledge set-up on the second network interface; d) sending an acknowledge set-up on the first network interface in response to receipt of the acknowledge set-up on the second network interface; and e) writing the data to memory based on information included in the set-up request and the acknowledge set-up.

A plurality of dynamic ports may be utilized on at least one of the first and second network interfaces for maintaining a plurality of audio conversations simultaneously. As such, the memory associates, for each conversation, a port number on which audio frames are received with an IP address and port number to where such audio frames are to be forwarded.

The address translation engine may further include a look-up engine for querying a database to determine a public network address associated with a destination client of a telephone call. In the event that the destination client is itself, behind an address translation engine, the public address may include the network address of a second tunneling address translation engine and a private network address identifying the destination client of the telephone call on a private network associated with the second tunneling address translation engine.

BRIEF DESCRIPTION OF THE DRAWINGS

FIG. 2 is a table representing information stored in a directory server useful in the audio communication system of FIG. 1;

FIG. 8 is an exemplary open calls table useful in the TAT server of FIG. 6.

DESCRIPTION OF THE PREFERRED EMBODIMENTS

Figure 1:
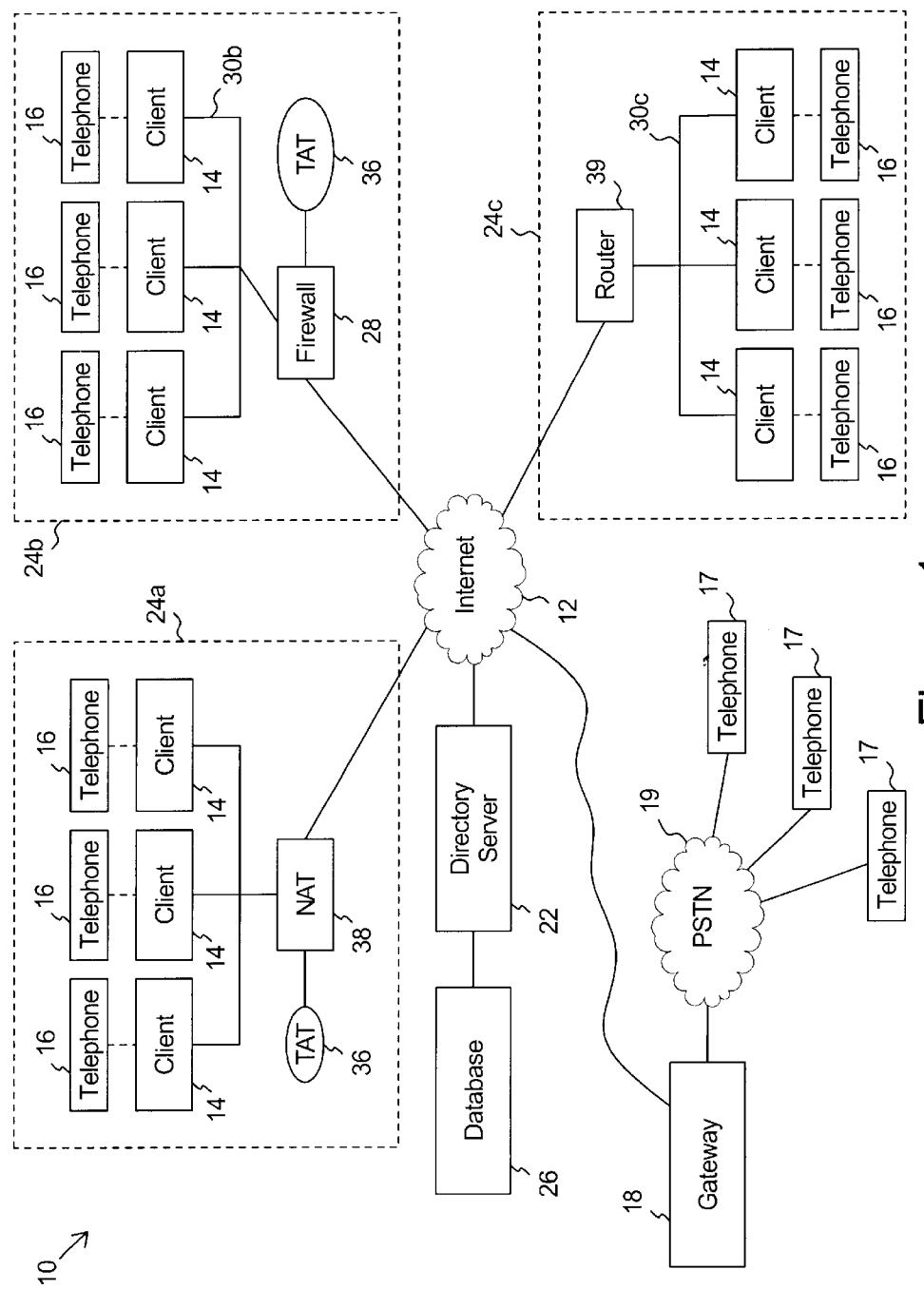
FIG. 1 is a block diagram of packet switched audio communication system utilizing the Internet.

The present invention will now be described in detail with reference to the drawings. In the drawings, like reference numerals are used to refer to like elements throughout.

Internet Telephony Architecture Overview

FIG. 1 is a block diagram of packet switched audio communication system 10 utilizing the Internet 12. The Internet 12 interconnects a plurality of private networks 24(a)–24(c) through a series of routers and high speed networks (not shown).

Each private network 24(a)–24(c) is connected to the Internet 12 via a router 39, a network address translation (NAT) server 38, or a firewall 28.

Network 24(c) is coupled to the Internet 12 via a router 39 which functions to couple IP traffic between clients 14 on the private network 24(c) to other devices coupled to the Internet 12. A typical internet service provider (ISP) utilizes this structure for connecting its clients to the Internet 12. Because network 24(c) is coupled to the Internet 12 by a router 39, each client 14 includes an IP address, either permanently assigned or assigned through a DHCP server each time the client is logged onto the private network 24(c), and can be referred to as directly coupled to the Internet 12.

Network 24(b) is coupled to the Internet 12 by a firewall 28 for providing security by controlling the exchange of data between clients 14 on the private network 24(b) and remote computing devices otherwise coupled to the Internet 12.

Network 24(a) is coupled to the Internet 12 by a NAT server 38 (e.g., proxy server) for enabling a plurality of clients 14 on the private network 24(a) to share an IP address for the purpose of connecting to remote computing devices coupled to the Internet 12.

Each of a plurality of clients 14 include a Plain Old Telephone Service (POTS) telephone handset 16 coupled thereto to provide a user interface for enabling the operator to converse with a remote person as if he or she were using a traditional telephone. In operation, the operator of a telephone handset 16 associated with the originating client (hereinafter referred to as the originating client 14(o)) dials the 10 digit telephone number into the telephone handset keypad which is permanently assigned to the destination client (hereinafter referred to as destination client 14(d)) to establish an Internet connection, or a plurality of daisy chained connections, between the originating client 14(o) and the destination client 14(d). Audio data will then be sent over the Internet connection to facilitate a normal telephone conversation between the operators of the originating client 14(o) and the destination client 14(d).

Human operators are accustomed to working with 10-digit telephone numbers which, once assigned to a person, remain relatively stable. However, each client 14 coupled to the Internet is addressed via a 12-digit IP address which may change each time the device logs onto a network. Further, if the device is coupled to the Internet through a NAT server, a 12-digit IP address plus a second 12-digit virtual IP address may be required to address the client 14. As such, a directory server 22 is also coupled to Internet 12 for facilitating the establishment of connections between the various clients 14. Each client 14 is assigned a permanent 10-digit telephone number and the directory server 22 includes a database 26 which stores the connection data needed to address the client 14 and updates. such connection data each time the address of the client 14 changes.

Briefly referring to FIG. 2, the directory server 22 and the database 26 associate a connection IP address and Q.931 port, and if applicable, a virtual IP address and Q.931 port with each 10-digit telephone number used to identify each client 14.

Referring again to FIG. 1, a NAT server 38 or a firewall 28 may prevent the exchange of internet telephony frames directly between a client 14 behind the NAT server 38 or behind firewall 28 and another client elsewhere coupled to the Internet. More specifically, a NAT server 38 utilizes the source address field in a TCP frame for establishing a proxy connection on behalf of a client on the private network. However, the system 10 utilizes UDP frames (for more efficient use of bandwidth), and UDP frames do not include a source address field. Therefore system 10 includes a plurality of Tunneling Address Translator (TAT) servers 36, one being associated with each firewall 28 and NAT 38. The TAT server 36 may run on the same hardware as the NAT server 38 or firewall 28 or may run on dedicated hardware coupled to the perimeter network of a firewall 28.

In operation, the originating client 14(o) receives a 10-digit telephone number from the operator. Then, the originating client 14(o), if it is directly connected to the Internet 12, utilizes the directory server 22 to determine the connection IP address 208 (FIG. 2) (and Q .931 port 210) and virtual IP address 204 (and Q.931 port 206) associated with the destination telephone number 210 for purposes of establishing the connection with the destination client 14(d). Alternatively, if the originating client 14(o) is itself behind a firewall 28 or NAT server 38, passes the 10-digit telephone number to the TAT server 36 with which it is associated and the TAT server 36 utilizes the directory server 22 to determine the connection IP address 208 (and Q.931 port 210) and virtual IP address 204 (and Q.931 port 206) associated with the destination telephone number 210.

Figure 3A:
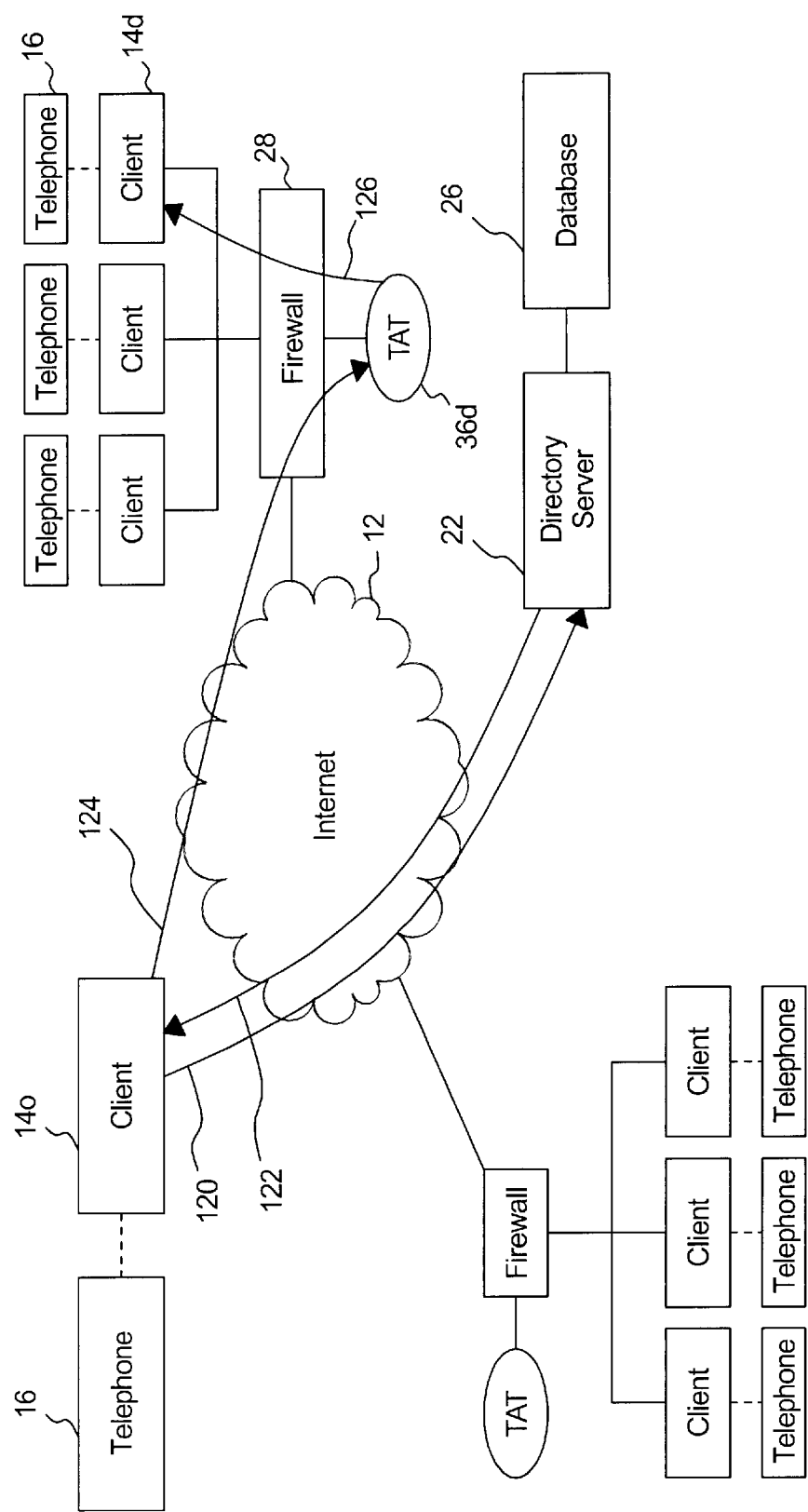
FIG. 3a is a block diagram showing a first embodiment of connection steps useful in the operation of the audio communication system of FIG. 1.

For example, referring to FIG. 3a the operator of the originating client 14(o) dials in the 10 digit telephone number permanently assigned to the destination client 14(d). Because client 14(o) is directly connected to the internet 12, it will directly query the directory server 22 to determine the connection IP address 208 (and Q.931 port 210) associated with the TAT server 36 which is associated with the destination client 14(d) (hereinafter referred to as destination TAT server 36(d)) and virtual IP address 204 (and Q.931 port 206) associated with the destination client 14(d). The query is indicated by the request arrow 120 and the response arrow 122. Thereafter, the originating client 14(o) will connect to the destination TAT server 36(d), as indicated by connection arrow 124, which in turn will connect to the destination client 14(d), as indicated by connection arrow 126, to establish the daisy chained connection between the originating client 14(o) and the destination client 14(d).

Figure 3B:
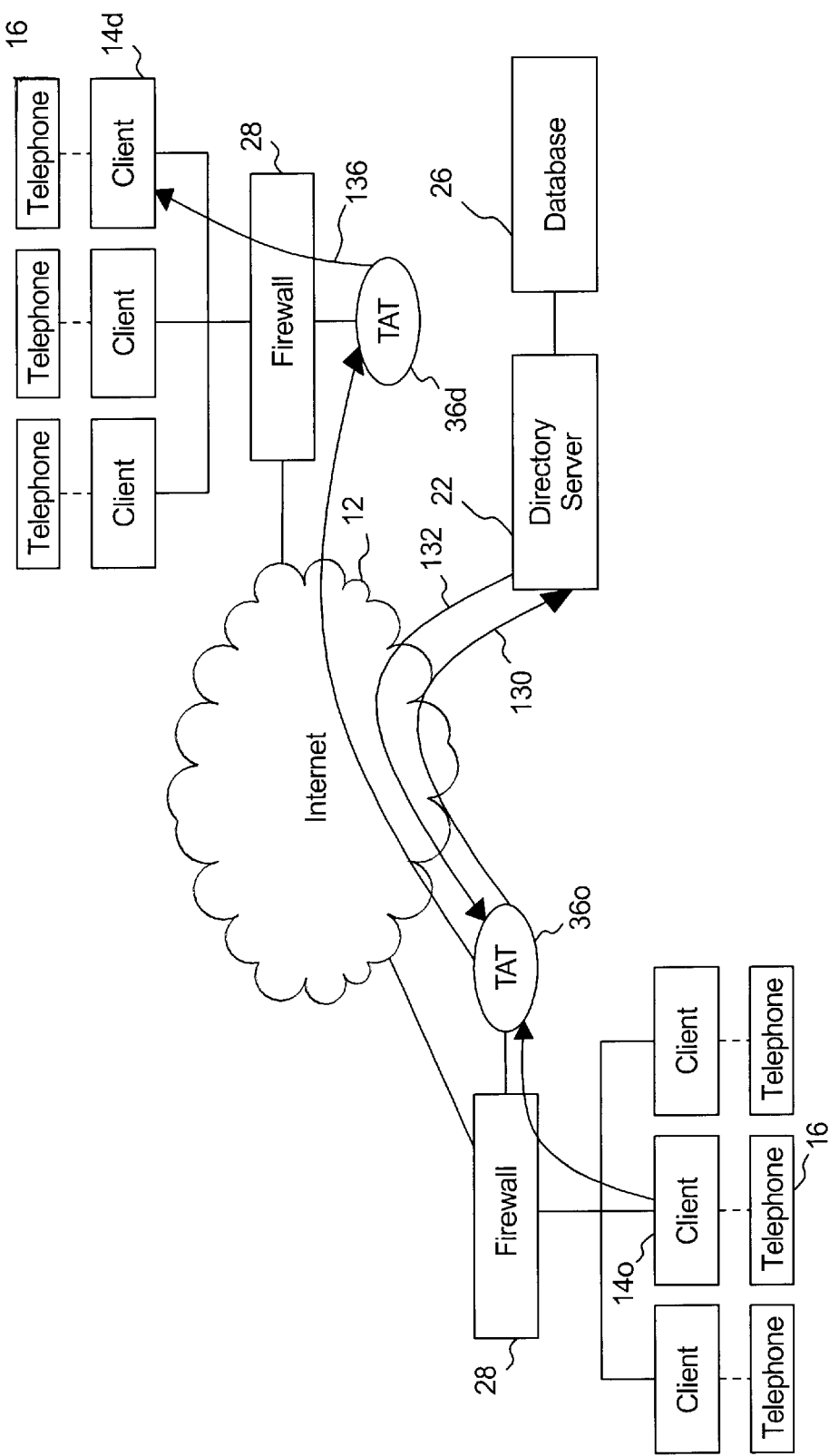
FIG. 3b is a block diagram showing a second embodiment of connection steps useful in the operation of the audio communication system of FIG. 1.

Referring to FIG. 3b for a second example, the operator again dials in the 10 digit telephone number permanently assigned to the destination client 14(d). Because client 14(o) is itself behind a TAT server 36 (hereinafter referred to as originating TAT server 36), client 14(o) does not directly query the directory server 22, but instead establishes a connection with the originating TAT server 36(o) as indicated by connection arrow 128 and passes the 10 digit telephone number to the originating TAT server 36(o). The TAT server 36(o) will then query the directory server 22 to determine the connection IP address 208 (and Q.931 port 210) associated with the destination TAT server 36(d) and virtual IP address 204 (and Q.931 port 206) associated with the destination client 14(d). The query is indicated by the request arrow 130 and the response arrow 132. Thereafter, the originating TAT server 36(o) will connect to the destination TAT server 36(d), as indicated by connection arrow 134, which in turn connect to the destination client 14(d), as indicated by connection arrow 136, to establish the daisy chained connection between the originating client 14(o) and the destination client 14(d).

Referring back to FIG. 1, the system 10 also includes a gateway 18 coupling the Internet 12 to the public switched telephone network (PSTN) 19. The gateway 18 enables telephone calls between telephone handsets 16 coupled to clients 14 on one of the private networks 24 telephone handsets 17 coupled to a subscriber loop on a local telephone company's PSTN network. In operation, if the 10-digit telephone number input by the operator does not associate with a client device 14 in the directory server 22, the connection will be established between the originating client 14(o) and the gateway 18 and the gateway 18 in turn will establish a connection over the public switched telephone network 20 (e.g. dial the 10-digit telephone number) with the client 17 associated with the 10-digit telephone number. Clients Referring to FIG. 4, an exemplary structure of each client 14 is shown. For purposes of this invention, the client 14 includes a processing unit 15 for operating a POTS emulation, circuit 60, a network interface circuit 62, a driver 72 for the POTS emulation circuit 60, a driver 74 for the network interface circuit 62, and an internet telephony application 76. The client device may be a desktop computer, and each of the POTS emulation circuit 60, and the network interface circuit 62 may be cards which plug into the computer expansion slots. However, other configurations are envisioned by this invention and include an appliance type of device with the functionality of the POTS emulation circuit 60, the network interface circuit 62, the drivers 72 and 74, and the internet telephony application 76 integrated into an embedded system.

The POTS emulation circuit 60 includes an RJ-11 female jack 64 for coupling the traditional POTS telephone handset 16 to the circuit 60. A tip and ring emulation circuit 66 emulates low frequency POTS signals on the tip and ring lines for operating the telephone handset 16. An audio system 68 couples between the tip and ring emulation circuit 66 and the internet telephony application 76. The audio system 68 operates to digitize audio signals from the microphone in the handset 16 and present the digitized signals to the internet telephony application 76, and simultaneously, operates to receive digital data representing audio signals from the internet telephony application 76 (representing the voice of the remote caller), convert the data to analog audio data, and present the analog audio data to the tip and ring emulation circuit 66. The tip and ring emulation circuit 66 modulates the tip and ring lines for driving the speaker of the handset 16 in accordance with the analog signal received from the audio system 68.

The network interface circuit 62 includes circuits for communicating frames of data with other devices coupled to the private network 30.

Figure 4:
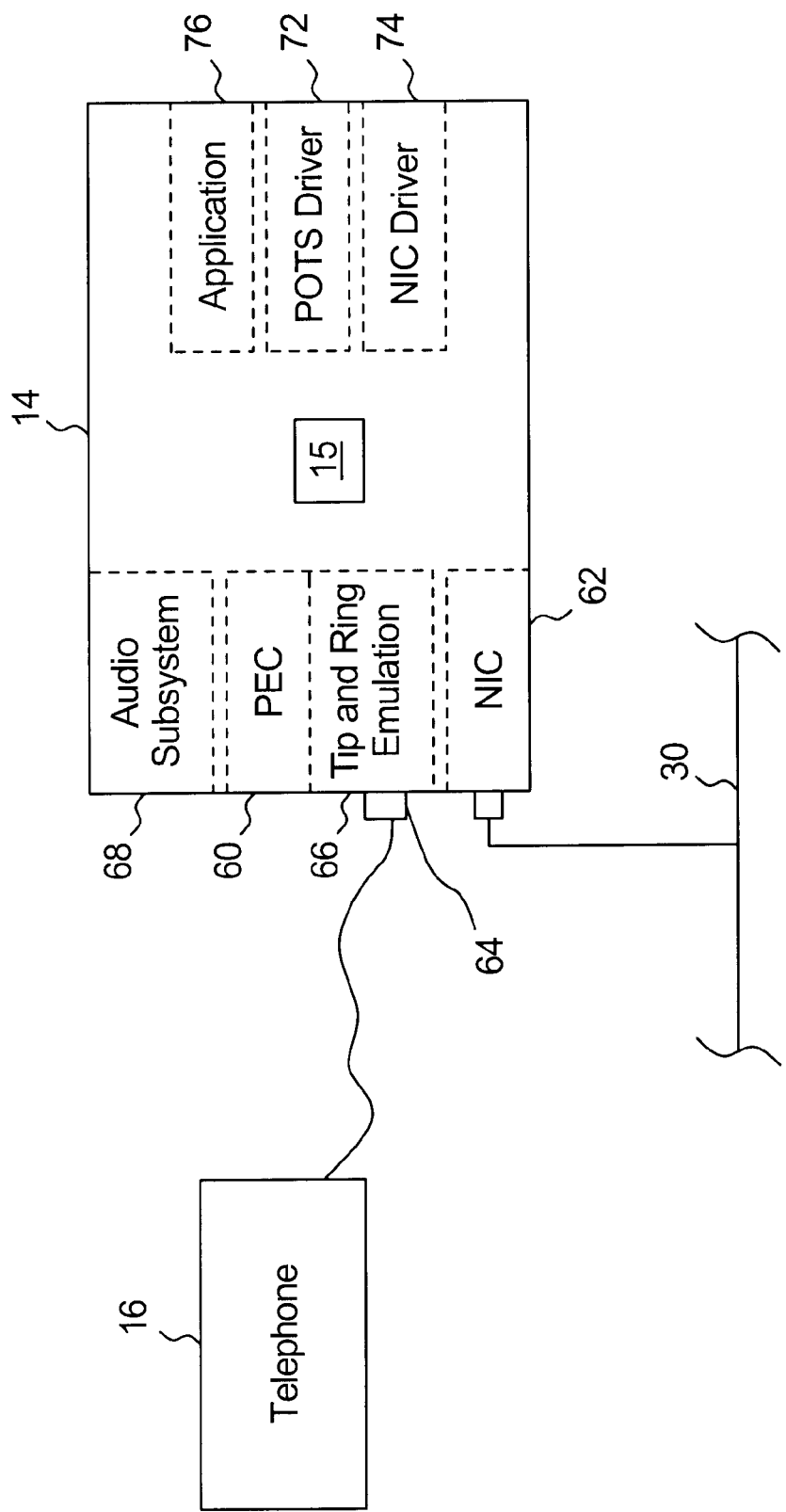
FIG. 4 is a block diagram of a client useful in the audio communication system of FIG. 1.
Figure 5:
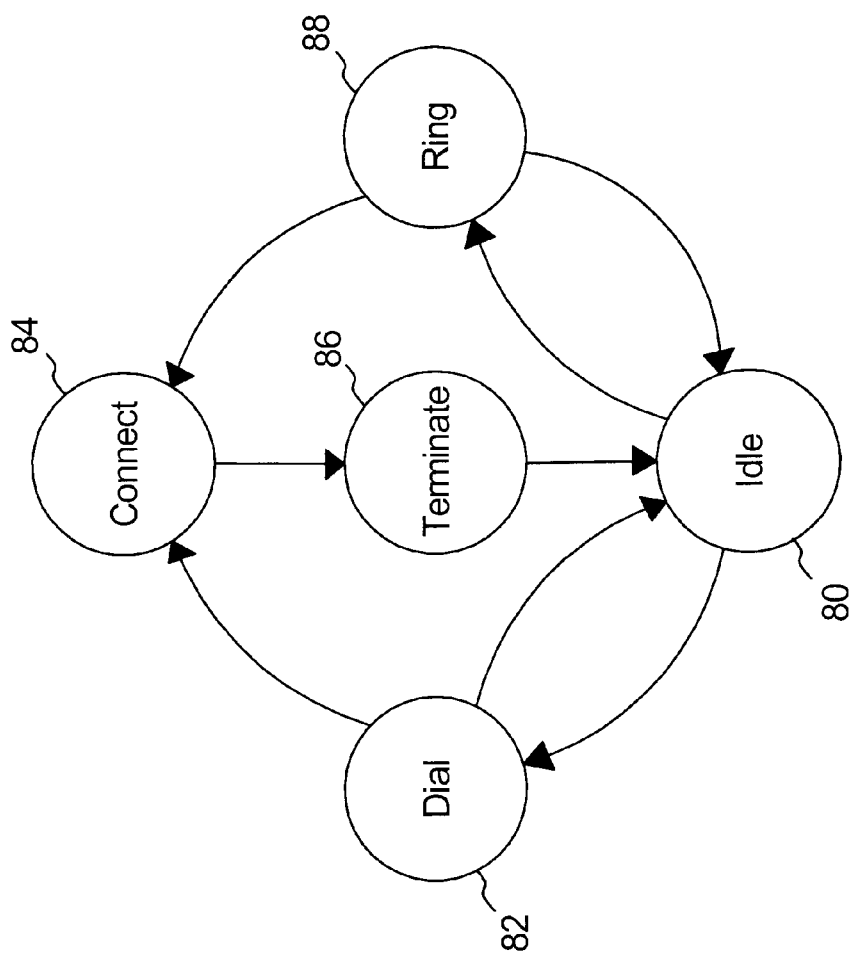
FIG. 5 is a state machine diagram showing exemplary operation of the client of FIG. 4.

Referring to the state machine diagram of FIG. 5 in conjunction with FIG. 4, basic operation of the internet telephony application 76 is shown. The idle state 80 represents the internet telephony application 76 sitting idle waiting for either the operator to initiate a telephone call or for a telephone call to be received from a remote location. The internet telephony application 76 will transition to dial state 82 if the operator picks up the telephone handset 16 and dials a telephone number. In the dial state 82, the internet telephony application 76 will receive data from the audio subsystem 68 representing the DTMF signals of the operator dialing the destination telephone number into the handset 16. After receiving the destination telephone number, the internet telephony application 76 transitions to the connect state 84 wherein it establishes an outbound connection, which, as previously discussed with reference to FIGS. 3a and 3b, may be a sequence of daisy chained connections through one or more TAT servers 36 over the internet with the destination client 14(d) and proceeds to exchange data representing the telephone call over the connection. After one of the operators has "hung-up", the internet telephony application 76 transitions to the terminate state 86 wherein the connection with the destination client 14(d) is closed and then transitions back to the idle state 80.

The internet telephony application 76 will transition from the idle state 80 to the ring state 88 if a call is received from a remote location (e.g., a remote device attempts to establish a Q.931 connection with the client 14). During the ring state 88, the internet telephony application 76 generates a signal appropriate for causing the tip and ring emulation circuit 66 to generate a traditional ring signal for the telephone handset 16. If the operator does not pick-up before the remote operator hangs up, the internet telephony application 76 will transition back to idle. Alternatively, if the operator picks-up the telephone handset 16, the internet telephony application 76 will transition to the connect state 84 where again it establishes an inbound connection with the remote device and proceeds to exchange data representing telephone conversation.

TAT Server

As previously discussed, if either, or both, of the originating client 14(o) and the destination client 14(d) are behind a NAT server 38 or a firewall 28, the connection between the originating client 14(o) and the destination client 14(d) will be a sequence of connections daisy chained through a TAT server 36 associated with each NAT server 38 or firewall 28. For a TAT server 36 to perform its part in a sequence of daisy chained connections, the TAT server 36 must be able to: 1) receive a connection request, establish a connection (inbound connection), and otherwise emulate a destination client 14(d) when receiving a connection request; 2) initiate a connection request, establish a connection (outbound connection), and otherwise emulate an originating client 14(o) to establish the next connection in the daisy chain; and 3) transfer data from frames received on the inbound connection to frames sent on the outbound connection.

Figure 6:
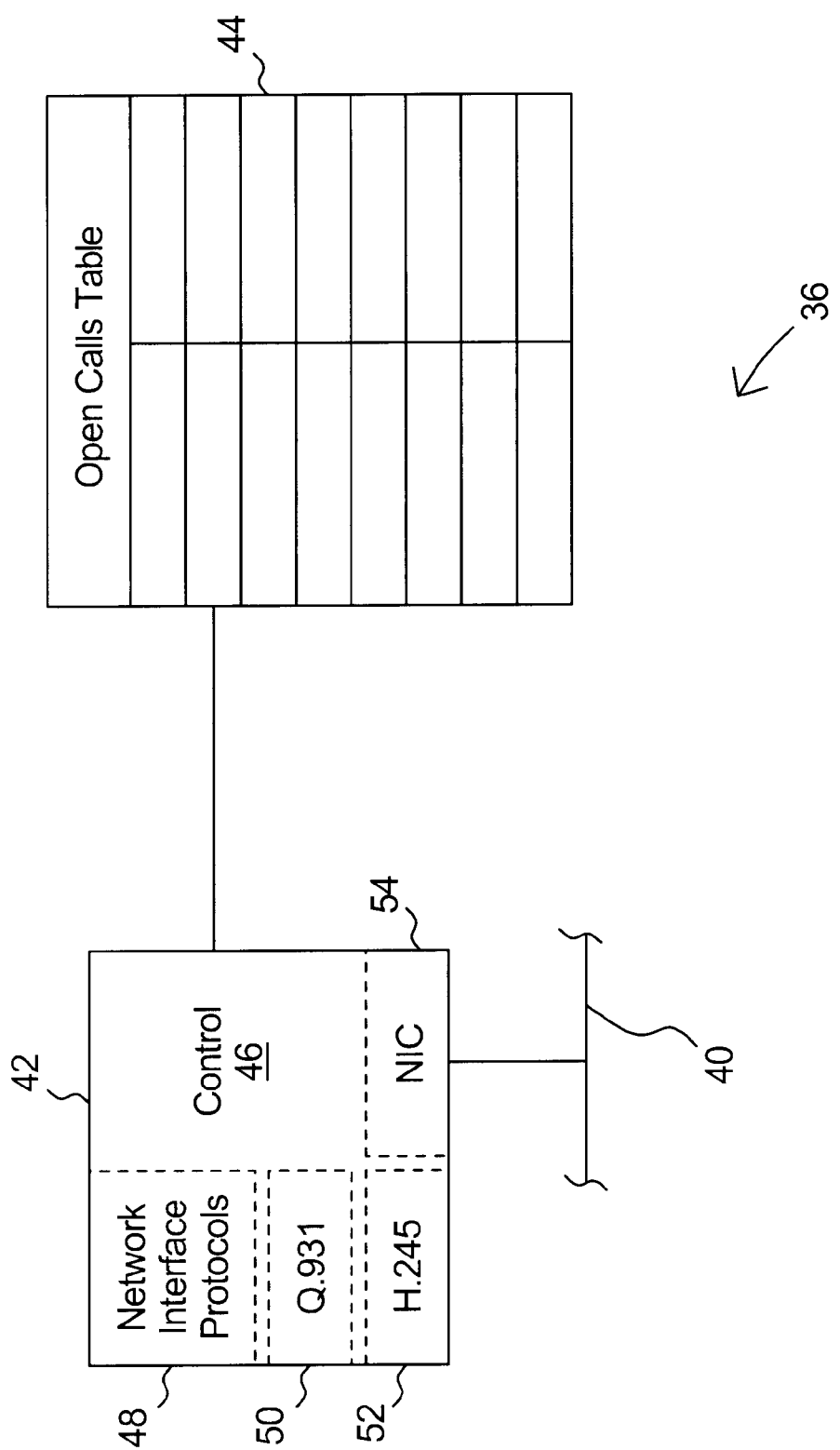
FIG. 6 is a block diagram of a tunneling address translation (TAT) server useful in the audio communication system of FIG. 1.

FIG. 6 shows a block diagram of fundamental elements of TAT server 36. TAT server 36 includes a control unit 46 for operating a Q.931 module 50 and an H.245 module 52 for setting up and receiving audio data on an inbound connection and for setting up and sending the audio data on the outbound connection. An open calls table 44 maintains a record for each connection daisy chained through TAT server 36 to enable the TAT server 36 to process several calls simultaneously. A more detailed discussion of the open calls table 44, along with the Q.931 connections, H.245 connections and RTP channels, is discussed later herein with respect to FIG. 7.

The control unit 46 may also operate network interface protocols 48 and drive a network interface circuit 54 for sending and receiving frames on a network 40. It should be appreciated network 40 may represent two or more separate network connections in situations where the TAT server 36 is implemented with a router coupled between two or more separate networks.

Figure 7:
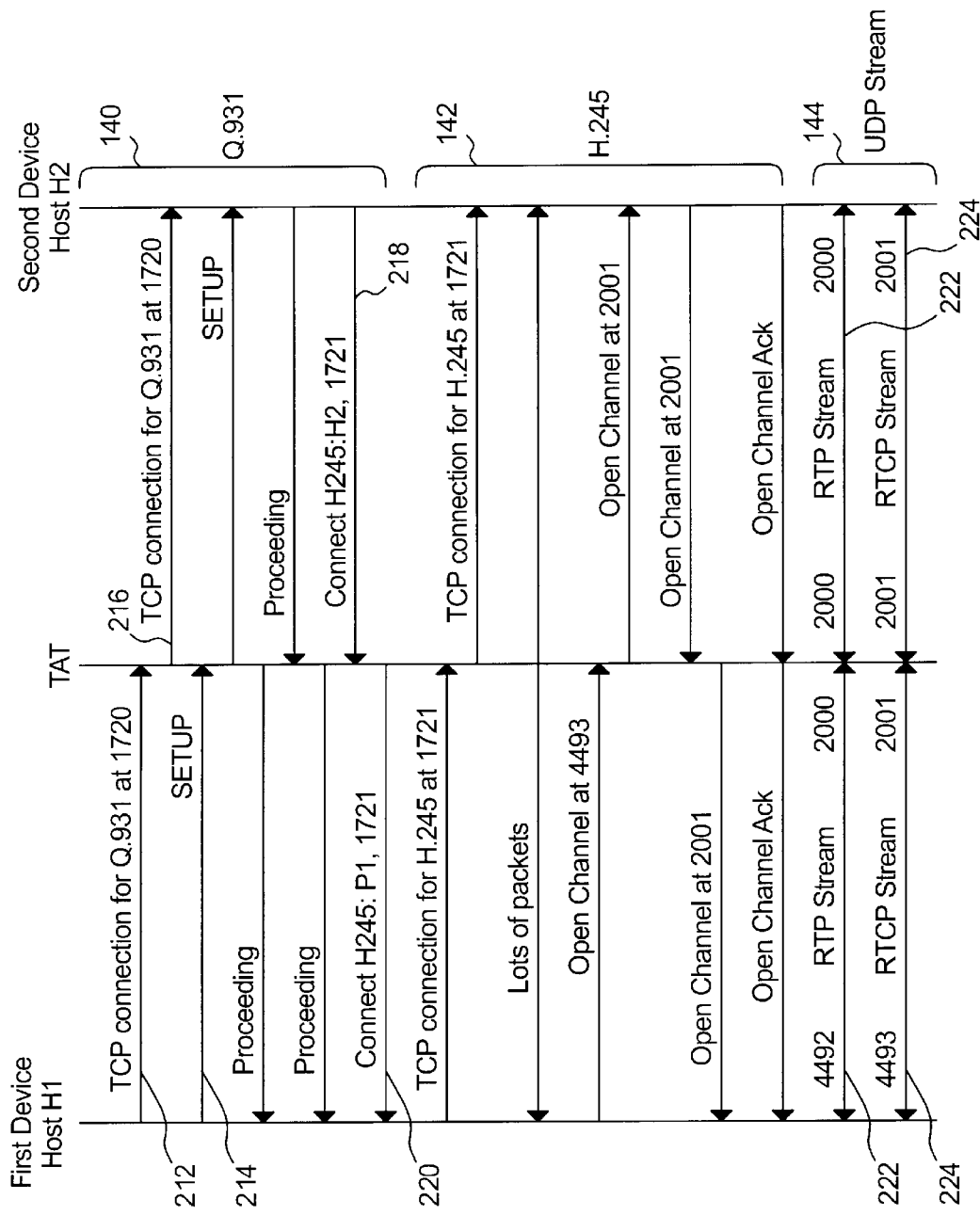
FIG. 7 is a ladder diagram showing exemplary operation of the TAT server of FIG. 6.

Referring to the ladder diagram of FIG. 7 in conjunction with the block diagram of FIG. 3b, the steps associated with establishing a daisy chain connection between first a device and a second device through TAT server 36 is shown.

Because TAT server 36 is a link in a series of daisy chained connections and does not function as an originating client 14(o), the first step 212 represents receiving a Q.931 connection request from the first device on port 1720. (Port 1720 being the well known port for receipt of Q.931 connection requests). The setup data 214 associated with the connection request may include either: 1) a 10-digit telephone number 202 associated with the destination client 14 in situations wherein the first device is the originating client 14(*o*) and the TAT server 36 is associated with the NAT server 38 or firewall 28 coupling the originating client 14(*o*) to the Internet; 2) a real IP address 208 and Q.931 port 210 of the second device if the second device is also a TAT server 36 along with a virtual IP address 204 and Q.931 port 206 of the destination client 14 which will be passed to the second TAT server for connection to the destination client 14; or 3) an IP address (real or virtual) if the second device is the destination client 14 to which the TAT server 36 will directly connect.

If a 10-digit telephone number 202 was received, the TAT server 36 must run a sub routine of querying the directory server 22 (FIG. 1) to obtain the IP address 208 of the second device (and, if appropriate, the virtual IP address 204 of the destination client).

The next step 216 represents sending a Q.931 setup request to the second device. After receiving a signal 218 from the second device indicating that the second device is ready to connect, the TAT server 36 exchanges frames of data with the second device representing each of the TAT servers, and the second device's media settings and establishes a master/slave relationship as is required for establishing communications utilizing the H.245 protocols.

Simultaneously, the TAT server 36 acknowledges 220 that it is ready to connect to the first device and exchanges frames of data with the first device representing the TAT server's and the first device's media settings and establishes a master/slave relationship with the first device. The above mentioned steps are represented on the ladder diagram by the Q.931 connection arrows 140.

Thereafter, (represented on the ladder diagram by H.245 set-up arrows 142) the TAT server 36 opens H.245 logical communication channels 144 for both real time protocol (RTP) data frames and real time control protocol (RTCP) frames to each of the first device and the second device. The RTP and RTCP channels 222 and 224 respectively are set up on dynamic port address so that the TAT server 36 operates as a connection device in the daisy chain connections for a plurality of Internet telephone calls taking place simultaneously.

The TAT server 36 writes appropriate data to the open calls table 44 which maps each of the inbound connections (and RTP channels) to its corresponding outbound connection (and RTP channels) for forwarding data. While writing data to the open calls table 44 is described with respect to this step for illustrative purposes, it should be appreciated that data may be written to the table 44 simultaneous with any other step during which the data is generated.

Referring briefly to FIG. 8, it can be seen that the open calls table includes data defining:

The Q.931 connection 150 with the call first device;
The Q.931 connection 152 with the call second device;
The H.245 connection 154 with the first device;
The H.245 connection 156 with the second device;
The RTP routing 158—inbound from the first device;
The RTP routing 160—outbound to the first device;
The RTP routing 162—inbound from the second device; and
The RTP routing 164—outbound to the second device.

More specifically, the data representing the Q.931 connection 150 with the first device includes i) the IP address and port number for the connection on the first device which initiated the call set up with the TAT and ii) the IP address and port number used by the TAT for such Q.931 connection with the first device. The Q.931 connection 152 with the second device includes i) the IP address and port number of the second device to which the connection request was sent by the TAT and ii) the IP address and port number used by the TAT for such Q.931 connection with the second device. It should be appreciated that because the TAT is coupled to a private network and to the public internet, it will likely have a different IP address on each network. As such, the TAT IP address utilized for the Q.931 connection 150 with the first device will be different than the TAT IP address utilized for the Q.931 connection 152 with the second device.

Similarly, the data representing the H.245 connection 154 with the first device includes i) the IP address and port number for the H.245 connection on the first device which initiated the call setup and ii) the IP address and port number used by the TAT for the H.245 connection with the first device. And, the data representing the H.245 connection 156 with the second device includes i) the IP address and port number of the second device to which the TAT sent the set up request and ii) the IP address and port number used by the TAT for the H.245 connection with the second device.

The RTP routing 158 is the routing used for sending RTP frames from the first device to the TAT and includes the IP address and port number on the first device used for RTP routing 158 and the IP address and port number on the TAT used for routing 158. Once RTP frames are received from the first device utilizing the RTP routing 158, the frames are sent by the TAT to the second device utilizing RTP routing 164 which is the routing used for sending RTP frames from the TAT to the second device. RTP routing 164 includes the IP address and port number on the TAT and the IP address and port number on the second device that are used for RTP routing 164.

Similarly, the RTP routing 162 is the routing used for sending RTP frames from the second device to the TAT and includes the IP address and port number on the second device used for RTP routing 162 and the IP address and port number on the TAT used for routing 162. And, once the RTP frames are received from the second device utilizing the RTP routing 162, the frames are sent by the TAT to the first device utilizing RTP routing 160 which is the routing used for sending RTP frames from the TAT to the first device. RTP routing 160 includes the IP address and port number on the TAT and the IP address and port number on the second device that are used for RTP routing 160.

Once communication channels are established between the first device client and that TAT server 36 between the TAT server 36 and the second device, frames of data representing the operators audio communications may be sent between the first device and the second device through the TAT server 36.

It should be appreciated that the Internet audio communication system of this invention provides for the ability to access clients on private networks independent of whether such clients are behind firewalls or NAT servers. Each client can be readily identified to human operators utilizing a convenient 10 digit telephone number and can be readily accessed over the Internet by utilizing a directory server for determining an Internet address for the destination client and utilizing one or more TAT servers to connect to the destination client independent of firewalls and NAT servers.

Additionally, although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A method of audio communication in a translation engine, the audio communication between a first device communicating with the translation engine through the internet and a first client communicating with the translation engine through a local area internet protocol compliant network, the method comprising:
   a) receiving a first set-up request from the first device first over the internet, the first set-up request being an internet protocol compliant frame addressed to an IP address of the translation engine and that identifies both a virtual IP address of the first client and a first logical port number of the first client on which the first client may receive an unsolicited set-up request over the local area internet protocol compliant network;
   b) sending a second set-up request to the first client over the local area internet protocol compliant network, the second set-up request being an internet protocol compliant frame addressed to the virtual IP address and the first logical port number received in the first set-up request;
   c) receiving identification of a local area network logical communication channel, the local area network logical communication channel comprising a second logical port number of the first client for receipt of frames of audio data;
   d) establishing an internet logical communication channel over the internet with the first device utilizing a first dynamic logical port on the translation engine for receiving frames of audio data from the first device; and
   e) receiving frames of audio data on the internet logical communication channel from the first device and sending each received frame to the first client on the local area network logical channel.

2. A tunneling address translation engine coupled between a local area internet protocol complaint network and the internet for maintaining a packet audio communication between a first device communicating with the translation engine through the internet internet and a first client communicating with the translation engine through the local area internet protocol compliant network, the translation engine comprising:
   a) a first network interface for exchanging frames with the first device on the internet and with the second client on the local area internet protocol complaint network;
   b) a call set-up module for:
      i) receiving a first set-up request from the first device first over the internet, the first set-up request being an internet protocol complaint frame addressed to an IP address of the translation engine that identifies both a virtual IP address of the first client and a first logical port number of the first client on which the first client may receive an unsolicited set-up request over the local area internet protocol compliant network; and
      ii) sending a second set-up request to the first client over the local area network, the second set-up request being an internet protocol compliant frame addressed to the virtual IP address and the first logical port number received in the first set-up request;
   c) a media setting exchange module for:
      i) receiving identification of a local area network logical communication channel, the local area network logical communication channel comprising a second logical port number of the first client for receipt of frames of audio data; and
      ii) establishing an internet logical communication channel over the internet with the first device utilizing a first dynamic logical port on the translation engine for receiving frames of audio data from the first device; and
   d) a media session control module for receiving frames of audio data on the internet logical communication channel from the first device and sending each received frame to the first client on the local area network logical channel.

3. The device of claim 2, wherein receiving the first set up request comprises establishing a TCP/IP connection with the first device on a translation engine port configured for receipt of set up requests and receiving the virtual IP address and logical port number through the TCP/IP connection.

4. A method of audio communication in a translation engine, the audio communication between a first device communicating with the translation engine through the internet and a first client communicating with the translation engine through a local area network, the method comprising:
   a) receiving a first set-up request from the first device first over the internet, the first set-up request identifying a virtual IP address of the first client and a first logical port number of the first client on which the first client may receive an unsolicited set-up request over the local area network;
   b) sending a second set-up request to the first client over the local area network utilizing the virtual IP address and the first logical port number received in the first set-up request;
   c) receiving identification of a local area network logical communication channel the local area network logical communication channel comprising a second logical port number of the first client for receipt of frames of audio data;
   d) establishing an internet logical communication channel over the internet with the first device utilizing a first dynamic logical port on the translation engine for receiving frames of audio data from the first device; and
   e) receiving frames of audio data on the internet logical communication channel from the first device and sending each received frame to the first client on the local area network logical channel; and
   f) wherein the step of receiving the first set up request comprises establishing a TCP/IP connection with the first device on a translation engine port configured for receipt of set up requests and receiving the virtual IP address and logical port number through the TCP/IP connection.

5. The method of claim 4 wherein the step of sending a second set-up request comprises establishing a TCP/IP connection with the first client between a translation engine port configured for sending set-up requests and the virtual IP address and the first logical port number received in the first set-up request.

6. The method of claim 5 further comprising:
   receiving, over the TCP/IP connection with the first client, a second port number established by the first client for setting up a second TCP/IP connection over the local area network for the exchange of media settings for an audio session;

providing, over the TCP/IP connection with the first device, a translation engine port number for setting up a second TCP/IP connection over the internet for exchange of media settings for an audio session;

setting up a second TCP/IP connection with the first device for the exchange of media settings; and setting up a second TCP/IP connection with the first client for exchange of media settings for an audio session.

7. The method of claim 6, wherein identification of a local area network logical communication channel is sent over the second TCP/IP connection with the first client.

8. A tunneling address translation engine coupled between a local area network and the internet for maintaining a packet audio communication between a first device communicating with the translation engine through the internet and a first client communicating with the translation engine through the local area network, the translation engine comprising:

a) a first network interface for exchanging frames with the first device on the internet and with the second client on the local area network;

b) a call set-up module for:
   i) receiving a first set-up request from the first device first over the internet, the first set-up request identifying a virtual IP address of the first client and a first logical port number of the first client on which the first client may receive an unsolicited set-up request over the local area network; and
   ii) sending a second set-up request to the first client over the local area network utilizing the virtual IP address and the first logical port number received in the first set-up request;

c) a media setting exchange module for:
   i) receiving identification of a local area network logical communication channel, the local area network logical communication channel comprising a second logical port number of the first client for receipt of frames of audio data; and
   ii) establishing an internet logical communication channel over the internet with the first device utilizing a first dynamic logical port on the translation engine for receiving frames of audio data from the first device; and d) a media session control module for receiving frames of audio data on the internet logical communication channel from the first device and sending each received frame to the first client on the local area network logical channel;

f) wherein receiving the first set up request comprises establishing a TCP/IP connection with the first device on a translation engine port configured for receipt of set up requests and receiving the virtual IP address and logical port number through the TCP/IP connection; and g) wherein sending a second set-up request comprises establishing a TCP/IP connection with the first client between a translation engine port configured for sending set-up requests and the virtual IP address and the first logical port number received in the first set-up request.

9. The device of claim 8, wherein:

a) the call set-up module further provides for:
   i) receiving, over the TCP/IP connection with the first client, a second port number established by the first client for setting up a second TCP/IP connection over the local area network for the exchange of media settings for an audio session;
   ii) providing, over the TCP/IP connection with the first device, a translation engine port number for setting up a second TCP/IP connection over the Internet, for exchange of media settings for an audio session;
   iii) setting up a second TCP/IP connection with the first device for the exchange of media settings; and
   iv) setting up a second TCP/IP connection with the first client for exchange of media settings for an audio session; and b) wherein the media setting exchange module:
   i) receives the identification of a logical communication channel for receipt of frames of audio data, from the first client over the second TCP/IP connection with the first client; and further
   ii) provides to the first device, over the second TCP/IP connection with the first device, identification of the first dynamic logical port on the translation engine for receiving frames for audio data from the first device.

* * * * *